(12) United States Patent
Deng et al.

(10) Patent No.: US 12,212,177 B2
(45) Date of Patent: Jan. 28, 2025

(54) METHOD AND SYSTEM FOR ADJUSTING DOUBLE-SIDED LCC COMPENSATION NETWORK OF WIRELESS CHARGING SYSTEM

(71) Applicant: BEIJING INSTITUTE OF TECHNOLOGY, Beijing (CN)

(72) Inventors: Junjun Deng, Beijing (CN); Zhenpo Wang, Beijing (CN); Qianning Mao, Beijing (CN); Shuo Wang, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 223 days.

(21) Appl. No.: 17/763,082

(22) PCT Filed: Apr. 16, 2021

(86) PCT No.: PCT/CN2021/087817
§ 371 (c)(1),
(2) Date: Mar. 23, 2022

(87) PCT Pub. No.: WO2022/021950
PCT Pub. Date: Feb. 3, 2022

(65) Prior Publication Data
US 2023/0142869 A1    May 11, 2023

(30) Foreign Application Priority Data

Jul. 27, 2020  (CN) .......................... 202010730011.0

(51) Int. Cl.
*H02J 7/00*  (2006.01)
*B60L 53/12*  (2019.01)
(Continued)

(52) U.S. Cl.
CPC .......... *H02J 7/00712* (2020.01); *B60L 53/12* (2019.02); *B60L 53/60* (2019.02); *H02J 7/0013* (2013.01);
(Continued)

(58) Field of Classification Search
USPC ......................................................... 320/108
See application file for complete search history.

(56) References Cited

U.S. PATENT DOCUMENTS

| 2017/0063170 | A1* | 3/2017 | Harper | H02J 50/80 |
| 2017/0072807 | A1* | 3/2017 | Matsumoto | H02J 50/12 |
| 2018/0090995 | A1* | 3/2018 | Arasaki | H02H 9/041 |

* cited by examiner

*Primary Examiner* — Samuel Berhanu
(74) *Attorney, Agent, or Firm* — McGlew and Tuttle, P.C.

(57) ABSTRACT

A method and a system for adjusting a double-sided LCC compensation network of a wireless charging system are provided. The method includes: obtaining a standard coupling coefficient, a rated operating frequency, and rated parameter values of compensation elements in the wireless charging system; determining change rates of output performance of the wireless charging system; determining an adjustable compensation element; obtaining a real-time coupling coefficient between the primary-side transmitting coil and the secondary-side receiving coil; determining whether the real-time coupling coefficient is less than a coupling coefficient threshold; and adjusting an operating frequency of the wireless charging system when the real-time coupling coefficient is not less than the coupling coefficient threshold; or adjusting both an operating frequency of the wireless charging system and the adjustable compensation element when the real-time coupling coefficient is less than the coupling coefficient threshold.

8 Claims, 3 Drawing Sheets

(51) Int. Cl.
*B60L 53/60* (2019.01)
*H02J 7/02* (2016.01)
*H02J 50/12* (2016.01)
*H02M 1/42* (2007.01)
*H02M 3/335* (2006.01)

(52) U.S. Cl.
CPC ................ *H02J 7/02* (2013.01); *H02J 50/12* (2016.02); *H02M 1/42* (2013.01); *H02M 3/33573* (2021.05); *B60L 2210/30* (2013.01); *B60L 2210/40* (2013.01); *H02J 2207/20* (2020.01)

METHOD AND SYSTEM FOR ADJUSTING DOUBLE-SIDED LCC COMPENSATION NETWORK OF WIRELESS CHARGING SYSTEM

CROSS REFERENCE TO RELATED APPLICATION

This application claims priority of the Chinese Patent Application No. 202010730011.0, entitled "METHOD AND SYSTEM FOR ADJUSTING DOUBLE-SIDED LCC COMPENSATION NETWORK OF WIRELESS CHARGING SYSTEM" filed with the China National Intellectual Property Administration (CNIPA) on Jul. 27, 2020, which is incorporated herein by reference in its entirety.

TECHNICAL FIELD

The present disclosure relates to a field of wireless charging, and in particular to a method and a system for adjusting a double-sided inductor-capacitor-capacitor (LCC) compensation network of a wireless charging system.

BACKGROUND ART

Wireless power transfer (WPT) is widely applied to fields such as health care, communication, and transportation due to advantages of convenience, safety, durability, and strong adaptability. A problem of inconvenience in charging will be resolved hopefully by application of the wireless power transfer in electric vehicles. FIG. 1 shows a schematic structural diagram of a wireless on-board charger system. A core part of the wireless on-board charger system includes a magnetic coupling mechanism, compensation networks, a primary-side inverter, and a secondary-side rectifier bridge, and the system has a notable feature that there is a relatively large gap between two coils of a coupler, that is, the two coils are loosely coupled. Power transfer is based on the Faraday electromagnetic induction principle, where an alternating current is input into a primary-side coil of the coupler to generate an alternating magnetic field, and electrical energy is induced in a secondary-side coil, thereby transferring the electrical energy between a primary side and a secondary side that are separated. An actual operating process is as follows: A power frequency alternating current voltage of a power grid is input into the system, firstly rectified into an intermediate direct current voltage through power factor correction (PFC), and then forms a high-frequency alternating current voltage through the inverter, and the high-frequency voltage is applied to a primary-side resonant circuit including a primary-side compensation network and a primary-side transmitting coil; and a high-frequency alternating current voltage is induced in a secondary-side receiving coil, and the high-frequency alternating current voltage is converted into, through the secondary-side rectifier bridge, after passing through a secondary-side resonant circuit including the secondary-side coil and a secondary-side compensation network, a direct current voltage required by an on-board battery, to charge the on-board battery.

Since the system transfers power by using a group of loosely coupled coils, the compensation networks are essential to improve efficiency and power. A double-sided LCC compensation network has attracted attention because stability thereof is relatively good, a resonance frequency is not affected by a coupling coefficient and a load change, and the double-sided LCC compensation network may operate with a unit power factor. Transmission power and transmission efficiency of a wireless charging system of the electric vehicle require high accuracy of a parking position of the vehicle. However, due to unavoidable parking deviation in a practical application, alignment of power transfer coils is inevitably offset, resulting in a decrease in the coupling coefficient and a decrease in an ability to transmit the power.

To resolve the foregoing problems, patent No. CN110277820A provides a parameter self-adjustment wireless charging system based on an LCC compensation network. It essentially is an apparatus that automatically adjusts inductance and capacitance of a compensation circuit. First, a controller in the system has a function of calculating parameters of a compensation capacitor and a compensation inductor of the system. When known parameters of the system, for example, a frequency, input and output voltages, self-inductance of a coil, and a maximum power, are written into the controller, the controller can automatically calculate compensation parameters required in a resonance condition. A primary-side compensation inductor and a secondary-side compensation inductor have sliding contacts (similar to slide rheostats). Moving positions of the sliding contacts of the primary-side compensation inductor and the secondary-side compensation inductor are controlled to correspond to calculated inductance values respectively. Each of a primary-side compensation capacitor and a secondary-side compensation capacitor uses a variable capacitor array including several series-parallel capacitor elements, and a switching element is provided on each branch, switches in the capacitor array are controlled so as to make capacitance value of the compensation capacitor (variable capacitor array) reach a calculated value. Therefore, a parameter of a component is quickly adjusted without disassembling and changing the component, thereby effectively improving power transfer efficiency. However, the double-sided LCC compensation network has a plurality of compensation elements including two compensation inductors and four compensation capacitors. In this solution, all compensation elements are designed as components with adjustable parameters. That is, to ensure an adjustable range, many additional electronic devices are added, which increases complexity of the system, a volume of the system and costs of the system, and limits feasibility due to limitation by installation space during actual application.

Patent No. CN110971015A designs a ground and on-board adjustable LCC resonance wireless charging system including a ground control unit and an on-board control unit. The ground control unit adjusts a capacitance value of a variable capacitor Cp2 by adjusting duty ratios of power transistors Qp1 and Qp2 of a ground adjustable LCC compensation network based on a load change, a coil offset change, and an input power supply fluctuation, thereby adjusting impedance of a ground unit to make the ground unit operate in a resonance state. The on-board control unit adjusts a capacitance value of a capacitor Cs2 by adjusting duty ratios of power transistors Qs3 and Qs4 of an on-board adjustable LCC resonance network based on an impedance change caused by a change in a coil offset distance and a load change, thereby adjusting impedance of an on-board unit to make the on-board unit operate in a resonance state. The two units operate cooperatively to make the entire wireless charging system perform magnetic coupling resonant charging. However, there is no theoretical basis for selecting a parallel compensation capacitor as an adjustable object. In addition, a capacitor being adjusted by adjusting duty ratios of power transistors increases control complexity, and an addition of the power transistors also increases costs, which causes an overall system structure more complex.

Patent No. CN110962635A provides a three-level and adjustable LCC resonance wireless charging system. A method for adjusting an adjustable capacitor in this solution is consistent with the method in the above patent No. CN110971015A, "GROUND AND ON-BOARD ADJUSTABLE LCC RESONANCE WIRELESS CHARGING SYSTEM", where, a ground/on-board adjustable LCC resonance network includes a variable capacitor of which a capacitance value is adjusted based on power transistors, and a ground/on-board control unit changes the capacitance value of the variable capacitor by controlling duty ratios of power transistors to make a ground/on-board unit operate in a magnetic coupling resonance state. Further, in this solution, a three-level circuit is provided on a primary side, which can implement a step-down and current-doubling function, and zero-voltage turn-on of the power transistors, and reduce voltage stress of the power transistors, when an external input power supply is a high-power power supply. According to the method, a primary-side circuit is adjusted to be the three-level circuit, to implement soft switching, which has a higher requirement on a primary-side control system. In addition, additional devices increase a volume, and costs, and make the circuit more complex.

Patent No. CN109823206A provides a soft switching high-efficiency soft switching wireless charging method based on bilateral phase shifting and frequency adjusting. In this solution, each of direct current sides of a transmitting end converter and a receiving end converter of a wireless charging system is connected with a soft switching auxiliary branch circuit in series. By controlling an auxiliary switching transistor on and off, and resonating a bridge arm voltage to zero before the switching transistor is switched on, zero-voltage turn-on of all transmitting end switching devices and receiving end switching devices is realized. In addition, a soft switching bilateral phase shifting control system makes, by using a frequency adjusting method, a switching frequency the same as a resonance frequency all the time. In the method, auxiliary circuits are added to both a primary side and a secondary side to implement soft switching, which makes the system more complex and difficult to control, and increases costs.

In conclusion, intentions of existing patents are to re-adjust a system to a resonance state when an operating condition changes. Although the method for adjusting parameters is direct and effective, for a composite compensation topology with a plurality of parameters, influences of the parameters on the system are not revealed, which causes unclear intention of parameter adjustment. In addition, a parameter change may lead to a change in a switching characteristic of a power transistor, thereby requiring an additional circuit or control policy to implement soft switching, which further increases control complexity.

SUMMARY

An intention of the present disclosure is to provide a method and a system for adjusting a double-sided LCC compensation network of a wireless charging system, according to which control complexity is reduced, and a rated power is output in a weak coupling condition by the wireless charging system.

In order to achieve the above effect, the present disclosure provides the following solutions.

A method for adjusting a double-sided LCC compensation network of a wireless charging system is provided, where the wireless charging system includes a primary-side direct current voltage source, a high-frequency inverter, a primary-side compensation circuit, a primary-side transmitting coil, a secondary-side receiving coil, a secondary-side compensation circuit, a rectifier, a load, and a controller, and the method for adjusting the double-sided LCC compensation network includes:

obtaining a standard coupling coefficient when the primary-side transmitting coil is aligned with the secondary-side receiving coil, a rated operating frequency, and rated parameter values of compensation elements in the wireless charging system, where the compensation elements include a primary-side compensation inductor, a primary-side series compensation capacitor, a primary-side parallel compensation capacitor, a secondary-side compensation inductor, a secondary-side series compensation capacitor and a secondary-side parallel compensation capacitor;

determining, based on changes in parameter values of the compensation elements, change rates of a parameter capable of reflecting output performance of the wireless charging system, where the parameter capable of reflecting the output performance of the wireless charging system includes an output power, an output voltage, or a maximum singular value of a transfer function;

determining an adjustable compensation element based on the change rates of the parameter capable of reflecting the output performance of the wireless charging system, where the adjustable compensation element is a compensation element corresponding to the greatest change rate of the parameter capable of reflecting the output performance of the wireless charging system;

obtaining a real-time coupling coefficient between the primary-side transmitting coil and the secondary-side receiving coil;

determining whether the real-time coupling coefficient is less than a coupling coefficient threshold; and adjusting an operating frequency of the wireless charging system when the real-time coupling coefficient is not less than the coupling coefficient threshold, where a range of the operating frequency is 81.38 kHz to 90 kHz; or adjusting both an operating frequency of the wireless charging system and the adjustable compensation element when the real-time coupling coefficient is less than the coupling coefficient threshold.

In an embodiment, the obtaining the real-time coupling coefficient between the primary-side transmitting coil and the secondary-side receiving coil may include:

obtaining a real-time input voltage of the primary-side direct current voltage source and a real-time current of the secondary-side compensation inductor; and determining the real-time coupling coefficient based on the real-time input voltage and the real-time current.

In an embodiment, the adjusting both the operating frequency of the wireless charging system and the adjustable compensation element when the real-time coupling coefficient is less than the coupling coefficient threshold may include:

determining a standard current value of the secondary-side compensation inductor based on the rated operating frequency;

adjusting a parameter value of the adjustable compensation element when adjusting the operating frequency to be 89 kHz;

determining a current value of the secondary-side compensation inductor based on the adjusted parameter value of the adjustable compensation element;

reserving the parameter value for the current value of the secondary-side compensation inductor within a specified fluctuation range, where the specified fluctuation range fluctuates around a standard current by ±10% of the standard current; and performing adjustments based on the reserved parameter value.

In an embodiment, after the reserving parameter value for the current value of the secondary-side compensation inductor within the specified fluctuation range, the method may further include:

obtaining a minimum current value required for releasing all accumulated charges on a parasitic capacitor of a metal-oxide semiconductor field-effect transistor (MOSFET) within dead time:

determining a current value of the MOSFET at a switching point with a high-order harmonic wave based on the reserved parameter value; and reserving again a reserved parameter value for the current value of the MOSFET at the switching point which is greater than the minimum current value.

A system for adjusting a double-sided LCC compensation network of a wireless charging system is provided, where the wireless charging system includes a primary-side direct current voltage source, a high-frequency inverter, a primary-side compensation circuit, a primary-side transmitting coil, a secondary-side receiving coil, a secondary-side compensation circuit, a rectifier, a load, and a controller, and the system for adjusting the double-sided LCC compensation network includes:

a first obtaining module, configured to obtain a standard coupling coefficient when the primary-side transmitting coil is aligned with the secondary-side receiving coil, a rated operating frequency, and rated parameter values of compensation elements in the wireless charging system, where the compensation elements include a primary-side compensation inductor, a primary-side series compensation capacitor, a primary-side parallel compensation capacitor, a secondary-side compensation inductor, a secondary-side series compensation capacitor and a secondary-side parallel compensation capacitor;

a module for determining change rates of a parameter capable of reflecting output performance of the wireless charging system, configured to determine, based on changes in parameter values of the compensation elements, the change rates of the parameter capable of reflecting the output performance of the wireless charging system, where the parameter capable of reflecting the output performance of the wireless charging system includes an output power, an output voltage, or a maximum singular value of a transfer function;

an adjustable compensation element determining module, configured to determine an adjustable compensation element based on the change rates of the parameter capable of reflecting the output performance of the wireless charging system, where the adjustable compensation element is a compensation element corresponding to the greatest change rate of the parameter capable of reflecting the output performance of the wireless charging system;

a real-time coupling coefficient obtaining module, configured to obtain a real-time coupling coefficient between the primary-side transmitting coil and the secondary-side receiving coil;

a determining module, configured to determine whether the real-time coupling coefficient is less than a coupling coefficient threshold;

a first adjustment module, configured to adjust an operating frequency of the wireless charging system when the real-time coupling coefficient is not less than the coupling coefficient threshold, where a range of the operating frequency is 81.38 kHz to 90 kHz; and a second adjustment module, configured to adjust both the operating frequency of the wireless charging system and the adjustable compensation element when the real-time coupling coefficient is less than the coupling coefficient threshold.

In an embodiment, the real-time coupling coefficient obtaining module may specifically include:

a first obtaining unit, configured to obtain a real-time input voltage of the primary-side direct current voltage source and a real-time current of the secondary-side compensation inductor; and a real-time coupling coefficient determining unit, configured to determine the real-time coupling coefficient based on the real-time input voltage and the real-time current.

In an embodiment, the second adjustment module may include:

a unit for determining a standard current of the secondary-side compensation inductor, configured to determine a standard current value of the secondary-side compensation inductor based on the rated operating frequency;

a unit for adjusting a parameter value of the adjustable compensation element, configured to adjust the parameter value of the adjustable compensation element when adjusting the operating frequency to be 89 kHz;

a unit for determining a current value of the secondary-side compensation inductor, configured to determine the current value of the secondary-side compensation inductor based on the adjusted parameter value of the adjustable compensation element;

a first reservation unit, configured to reserve the parameter value for the current value of the secondary-side compensation inductor within a specified fluctuation range, where the specified fluctuation range fluctuates around a standard current by +10% of the standard current; and an adjustment unit, configured to perform adjustments based on the reserved parameter values.

In an embodiment, the second adjustment module may include:

a second obtaining unit, configured to obtain a minimum current value required for releasing all accumulated charges on a parasitic capacitor of an MOSFET within dead time;

a unit for determining a current value of the MOSFET at a switching point, configured to determine the current value of the MOSFET at the switching point with a high-order harmonic wave based on the reserved parameter value; and a second reservation unit, configured to reserve again a reserved parameter value for the current value of the MOSFET at the switching point which is greater than the minimum current value.

According to specific embodiments provided in the present disclosure, the present disclosure discloses the following technical effects:

According to the method and the system for adjusting the double-sided LCC compensation network of the wireless charging system provided in the present disclosure, a compensation element having the greatest effect on the system is determined, that is, a key compensation element having adjustment significance is selected based on a sensitivity analysis result, to reduce a quantity of adjustable parameters, and reduce an increase in a volume of the system; and then the parameter value of the adjustable compensation element is calculated and determined based on the real-time coupling coefficient, thereby outputting a rated power in a weak coupling condition by the wireless charging system.

BRIEF DESCRIPTION OF THE DRAWINGS

In order to describe the technical solutions of embodiments of the present disclosure or the conventional art more clearly, the accompanying drawings used in the embodiments will be briefly described below. Obviously, the accompanying drawings in the following description are only some embodiments of the present disclosure, and for a person of ordinary skill in the art, other accompanying drawings can be obtained from these accompanying drawings without creative efforts.

DETAILED DESCRIPTION OF THE EMBODIMENTS

The technical solutions in the embodiments of the present disclosure will be clearly and completely described below with reference to the accompanying drawings in the embodiments of the present disclosure. Obviously, the described embodiments are only a part of the embodiments of the present disclosure, rather than all of them. Other embodiments obtained by a person of ordinary skill in the art based on the embodiments of the present disclosure without creative efforts shall fall within the scope of the present disclosure.

An intention of the present disclosure is to provide a method and a system for adjusting a double-sided LCC compensation network of a wireless charging system, which reduce control complexity, and realize a rated power output in a weak coupling of the wireless charging system.

In order to make the above purposes, features and advantages of the present disclosure more obvious and easier to understand, the present disclosure will be further described below in detail with reference to the accompanying drawings and the specific implementations.

Figure 1:
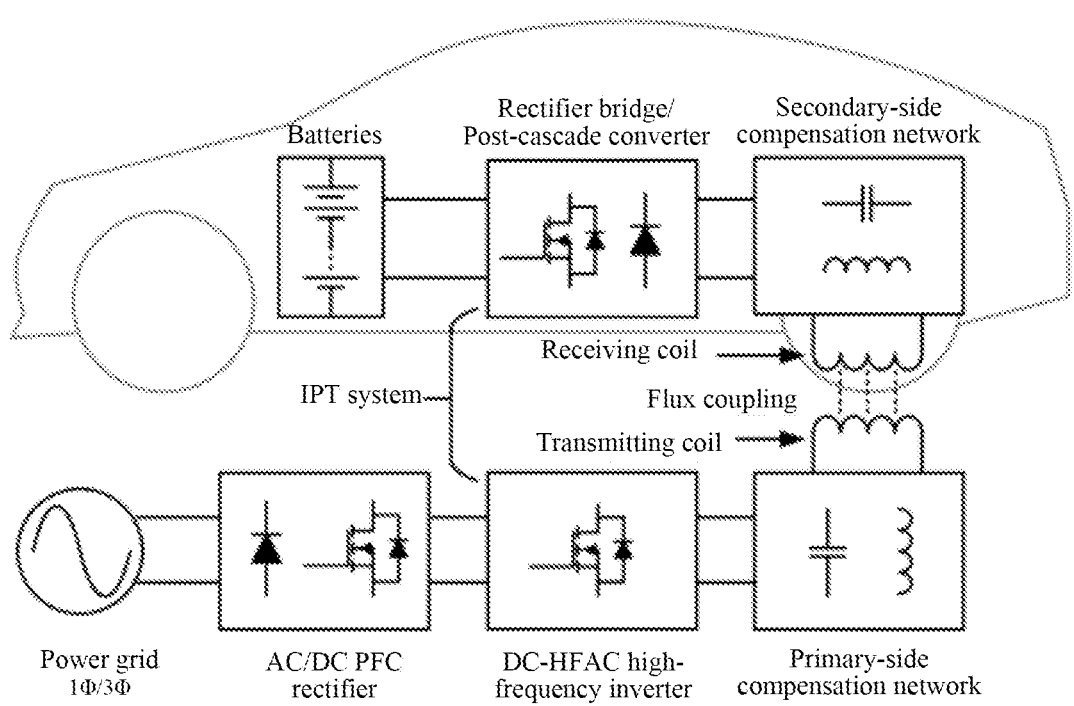
FIG. 1 is a schematic structural diagram of a wireless on-board charger system.
Figure 2:
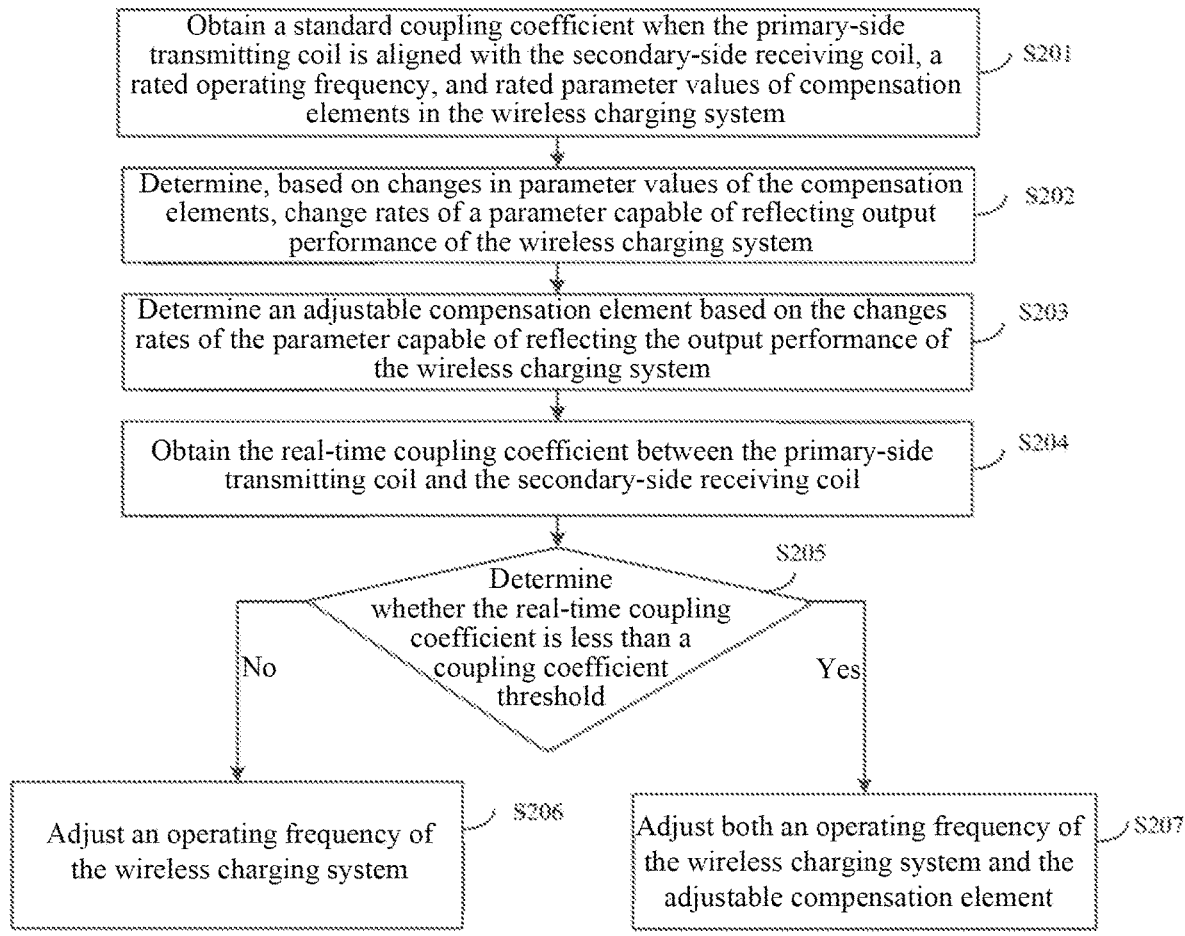
FIG. 2 is a schematic flow diagram of a method for adjusting a double-sided LCC compensation network of a wireless charging system according to the present disclosure.

FIG. 2 is a schematic flow diagram of a method for adjusting a double-sided LCC compensation network of a wireless charging system according to the present disclosure. FIG. 2 shows the method for adjusting the double-sided LCC compensation network of the wireless charging system according to the present disclosure. The wireless charging system includes a primary-side direct current voltage source, a high-frequency inverter, a primary-side compensation circuit, a primary-side transmitting coil, a secondary-side receiving coil, a secondary-side compensation circuit, a rectifier, a load, and a controller, and the method for adjusting a double-sided LCC compensation network includes steps S201-S207.

Figure 3:
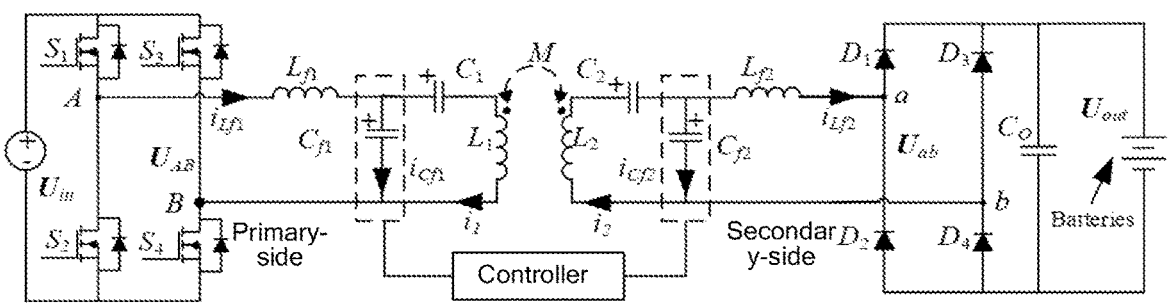
FIG. 3 is a schematic structural diagram of a double-sided LCC compensation network of a wireless charging system.

S201: A standard coupling coefficient when the primary-side transmitting coil is aligned with the secondary-side receiving coil, a rated operating frequency, and rated parameter values of compensation elements in the wireless charging system are obtained, where the compensation elements include a primary-side compensation inductor, a primary-side series compensation capacitor, a primary-side parallel compensation capacitor, a secondary-side compensation inductor, a secondary-side series compensation capacitor and a secondary-side parallel compensation capacitor. FIG. 3 is a schematic structural diagram of the double-sided LCC compensation network of the wireless charging system.

Elements of the double-sided LCC compensation network of the wireless charging system meet:

$$\begin{cases} j\omega_0 L_{f1} = \dfrac{1}{j\omega_0 C_{f10}} \\ j\omega_0 L_{f2} = \dfrac{1}{j\omega_0 C_{f20}} \\ j\omega_0 L_1 - \dfrac{1}{j\omega_0 C_1} = \dfrac{1}{j\omega_0 C_{f10}} \\ j\omega_0 L_2 - \dfrac{1}{j\omega_0 C_2} = \dfrac{1}{j\omega_0 C_{f20}} \end{cases}.$$

Wherein, j is a complex symbol, $\omega_0 = 2\pi f_0$, and $f_0$ is a resonance frequency. According to Standard SAE J2954, 85 kHz (81.38 kHz to 90 kHz) is an operating frequency band commonly used by a light-duty vehicle charging system. In other words, a rated parameter design of the double-sided LCC compensation network makes a primary side and a secondary side in a resonance state at a frequency $f_0$. $L_1$ is a rated inductance value of the primary-side transmitting coil, $L_2$ is a rated inductance value of the secondary-side receiving coil, $L_{f1}$ is a rated inductance value of the primary-side compensation inductor, $L_{f2}$ is a rated inductance value of the secondary-side compensation inductor, $C_{f10}$ is a rated capacitance value of the primary-side parallel compensation capacitor, and $C_{f20}$ is a rated capacitance value of the secondary-side parallel compensation capacitor.

S202: change rates of a parameter capable of reflecting output performance of the wireless charging system are determined based on changes in parameter values of the compensation elements, that is, sensitivity analysis. The parameter capable of reflecting the output performance of the wireless charging system includes an output power, an output voltage, or a maximum singular value of a transfer function.

The compensation elements include two compensation inductors and four compensation capacitors that are the primary-side compensation inductor $L_{f1}$, the primary-side series compensation capacitor $C_1$, the primary-side parallel compensation capacitor $C_{f1}$, the secondary-side compensation inductor $L_{f1}$, the secondary-side series compensation capacitor $C_2$, and the secondary-side parallel compensation capacitor $C_{f2}$.

In a specific embodiment, change rates of the output power when the parameter values of the compensation elements change within a same range (for example, ±10% of the rated parameter values) are determined. A greater change rate of the output power indicates that the compensation element has a greater effect on the system within the same parameter change range, that is, the system is most sensitive to a change in the compensation element.

In a specific embodiment, a state equation is listed. The state equation is a ratio of output variables to input variables, from which the maximum singular value of the transfer function is calculated. Change rates of the maximum singular value when the compensation elements change within the same range (for example, +10% of the rated parameter values) are compared. A greater change rate of the maximum singular value indicates that the compensation element has greater effect on the system within the same parameter change range, that is, the system is most sensitive to a change of the compensation element.

S203: An adjustable compensation element is determined based on the change rates of the parameter capable of reflecting the output performance of the wireless charging system, where the adjustable compensation element is a compensation element corresponding to the greatest change rate of the parameter capable of reflecting the output performance of the wireless charging system. The adjustable compensation elements are the primary-side parallel compensation capacitor $C_{f1}$ and the secondary-side parallel compensation capacitor $C_{f2}$.

$C_{f1}$ and $C_{f2}$ are set to adjustable capacitors, and adjusted capacitance values are defined as:

$$\begin{cases} C_{f1} = \alpha C_{f10} \\ C_{f2} = \beta C_{f20} \end{cases}.$$

$\alpha$ and $\beta$ are gains of the primary-side parallel compensation capacitor $C_{f1}$ and the secondary-side parallel compensation capacitor $C_{f2}$ respectively, and $C_{f10}$ and $C_{f20}$ are designed rated values thereof respectively.

S204: The real-time coupling coefficient between the primary-side transmitting coil and the secondary-side receiving coil is obtained.

S204 specifically includes:
obtaining a real-time input voltage of the primary-side direct current voltage source and a real-time current of the secondary-side compensation inductor, where
specifically, the real-time input voltage of the primary-side direct current voltage source and the real-time current of the secondary-side compensation inductor at the rated operating frequency are obtained; and
determining the real-time coupling coefficient based on the real-time input voltage and the real-time current.

The real-time coupling coefficient is determined by using a formula $$k = \frac{\pi}{2\sqrt{2}\, u_{in}} \cdot \frac{i_{LF2} \omega_0 L_{f1} L_{f2}}{\sqrt{L_1 L_2}},$$

where $u_{in}$ is the real-time input voltage, and $i_{Lf2}$ is the real-time current (i.e., an effective current value of the secondary-side compensation inductor $L_{f2}$).

S205: It is determined whether the real-time coupling coefficient is less than a coupling coefficient threshold.

A process of determining the coupling coefficient threshold is as follows:

When there is an offset in relative positions between the primary-side transmitting coil and the secondary-side receiving coil, a coupling coefficient deviates from a rated value, and the output power then deviates accordingly. Generally, when the coupling coefficient deviates slightly, a frequency adjustment can correct the output power to a certain extent. However, the frequency adjustment is limited to 81.38 kHz to 90 kHz for a light-duty vehicle due to the limitation of the frequency adjustment. In further analysis, degrees of deviation of the coupling coefficient need to be classified based on whether the output power can be corrected only by the frequency adjustment within a specified frequency band. A coupling coefficient value at a boundary between where the power can be corrected only through the frequency adjustment and where the power cannot be corrected only through the frequency adjustment is found, and this coupling coefficient value is the coupling coefficient threshold $k_e$.

S206: An operating frequency of the wireless charging system is adjusted when the real-time coupling coefficient is not less than the coupling coefficient threshold, where a range of the operating frequency is 81.38 kHz to 90 kHz.

S207: Both the operating frequency of the wireless charging system and the adjustable compensation element are adjusted when the real-time coupling coefficient is less than the coupling coefficient threshold.

S207 specifically includes:
determining a standard current value $i_{Lf2\_0}$ of the secondary-side compensation inductor based on the rated operating frequency, where
specifically, the standard current value $i_{Lf2\_0}$ of the secondary-side compensation inductor is determined based on the rated operating frequency and a standard coupling coefficient;
adjusting a parameter value of the adjustable compensation element when adjusting the operating frequency to be 89 kHz;
determining a current value of the secondary-side compensation inductor based on the adjusted parameter value of the adjustable compensation element, where
the current values of the secondary-side compensation inductor are determined by using a $$I_{Lf2} = \frac{-jZ_m U_{AB}}{Deno}, \text{ where}$$

$$\begin{cases} Deno = j(C_{f10}C_{f20}Z_1Z_4Q_1\alpha\beta\omega^2 - Q_4) \\ \qquad + (C_{f10}Z_1Q_3\alpha\omega + C_{f20}Z_4Q_2\beta\omega) \\ Q_1 = Z_2Z_3 - Z_m^2 \\ Q_2 = Z_1Z_3 + Q_1 \\ Q_3 = Z_2Z_4 + Q_1 \\ Q_4 = Z_1Z_3 + Z_1Z_4 + Q_3 \end{cases} \text{and} \begin{cases} Z_1 = j\omega L_{f1} \\ Z_2 = \dfrac{1}{j\omega C_1} + j\omega L_1 \\ Z_3 = \dfrac{1}{j\omega C_2} + j\omega L_2 \\ Z_4 = j\omega L_{f2} + R_{eq} \\ Z_m = j\omega M \end{cases},$$

where $I_{Lf2}$ is an effective current value of the secondary-side compensation inductor, $U_{AB}$ is an effective value of an output voltage of the inverter, $R_{eq}$ is an equivalent resistance value of a load before the rectifier, M is a mutual inductance value between the primary-side transmitting coil and the secondary-side receiving coil, and Deno, $Q_1$-$Q_4$, $Z_1$-$Z_4$, and $Z_m$ are symbols defined to facilitate expression of the current $I_{Lf2}$, and have no actual physical meaning;

reserving the parameter value for the current value of the secondary-side compensation inductor within a specified fluctuation range, that is, reserving the adjusted parameter values corresponding to the current values of the secondary-side compensation inductor within the specified fluctuation range, where the specified fluctuation range fluctuates around a standard current by ±10% of the standard current; and performing adjustments based on the reserved parameter value.

In order to implement soft switching and ensure an efficient transfer of system power, after reserving parameter value for the current value of the secondary-side compensation inductor within the specified fluctuation range, the method further includes:

obtaining a minimum current value required for releasing all accumulated charges on a parasitic capacitor of an MOSFET within dead time;

determining a current value of the MOSFET at a switching point with a high-order harmonic wave based on the reserved parameter value, where specifically, the current value of the MOSFET at the switching point in consideration of the high-order harmonic wave is determined based on the reserved parameter value; and reserving again a reserved parameter value for the current value of the MOSFET at the switching point which is greater than the minimum current value, that is, reserving again the reserved parameter value corresponding to the current value of the MOSFET at the switching point that is greater than the minimum current value.

An input current $I_{Lf1\_n}$ of an $n^{th}$ harmonic wave is determined by using a formula $$I_{Lf1\_n} = \frac{-U_{AB\_n}(C_{f10}\alpha\omega_n \cdot Deno - jC_{f20}Z_3Z_4\beta\omega_n - Z_3 - Z_4)}{Deno \cdot (-C_{f10}Z_1\alpha\omega_n + j)},$$

where $U_{AB\_n}$ is a voltage corresponding to the $n^{th}$ harmonic wave, and $\omega_n$ is a frequency corresponding to the voltage corresponding to the $n^{th}$ harmonic wave.

A phase angle of input impedance is determined by using a formula $$\theta_{in} = \frac{180}{\pi}\tan^{-1}\frac{Im(Z_{in})}{Re(Z_{in})},$$

where $Z_{in}$ is the input impedance of the system.

The current value of the MOSFET at the switching point is determined by using a formula $i_{off}(t=0)=i_{Lf1\_1}\cdot\sin\theta_{in\_1}+i_{Lf1\_3}\cdot\sin\theta_{in\_3}+i_{Lf1\_5}\cdot\sin\theta_{in\_5}+\ldots+i_{Lf1\_n}\cdot\sin\theta_{in\_n}$, where $i_{off}(t=0)$ is an instantaneous input current value of the MOSFET at a moment when a switch is closed and the high-order harmonic wave is considered, and $\theta_{in\_1}$, $\theta_{in\_3}$, $\theta_{in\_5}$, and $\theta_{in\_n}$ respectively represent phase angles of input impedance corresponding to the first, third, fifth, and $n^{th}$ harmonic voltages.

In the present disclosure, the most critical compensation element is determined, which helps reduce complexity of a topology structure and control difficulty. In addition, the method is also suitable for engineering applications, and helps reduce costs.

The proposed solution meets a power requirement and implements soft switching only by adjusting fewer compensation elements, and the control method is simple and easy to implement. Additionally, there is no need to add an additional auxiliary circuit to achieve soft switching, which helps reduce costs and a volume of the system.

The present disclosure quantifies a relationship between the adjustable element, the output current, and the current of the MOSFET at the switching point, and provides a detailed calculation method of a target parameter value. Compared with some conventional parameter adjustment methods, the present disclosure more quantitatively discloses a system mechanism and effect of a parameter change on the system.

The present disclosure further enhances an anti-offset capability of the double-sided LCC system although some conventional research solutions enhance the anti-offset capability of the system in terms of a magnetic coupling mechanism. The present disclosure expands an effective range of the frequency adjustment, and with assistance of key parameters, an ability of the frequency adjustment is improved.

Figure 4:
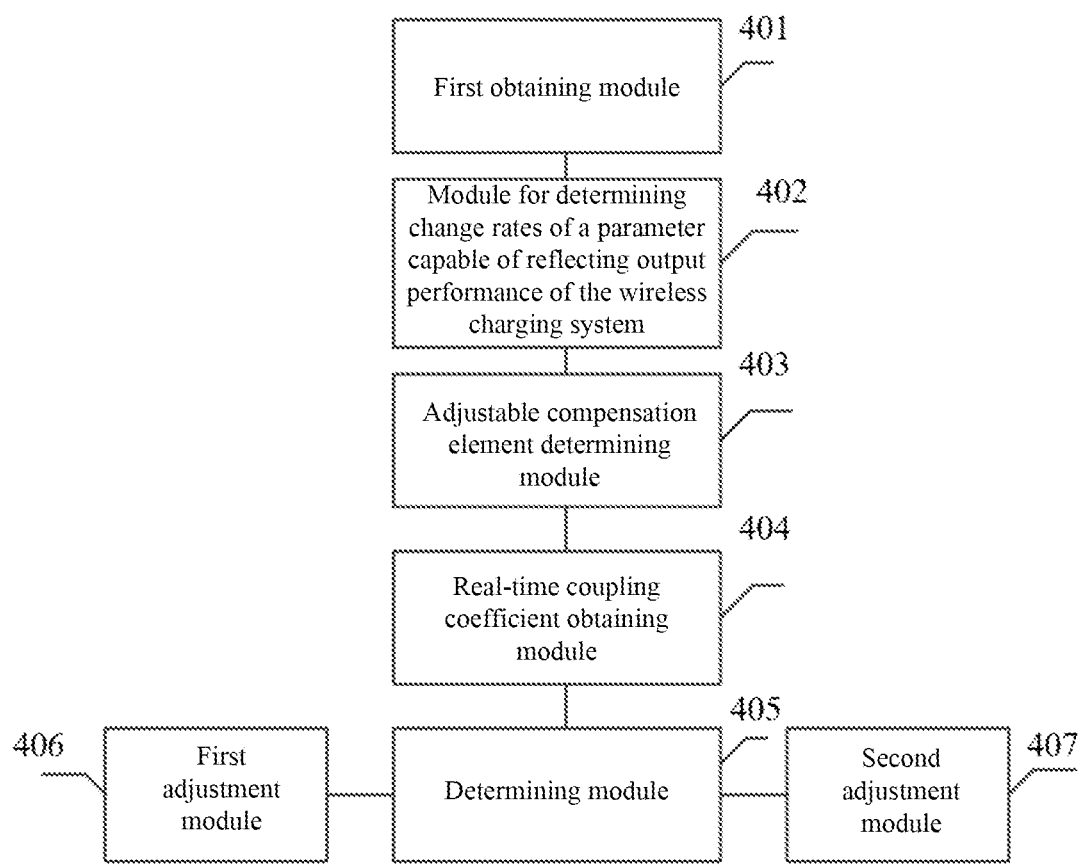
FIG. 4 is a schematic structural diagram of a system for adjusting a double-sided LCC compensation network of a wireless charging system according to the present disclosure.

FIG. 4 is a schematic structural diagram of a system for adjusting a double-sided LCC compensation network of a wireless charging system according to the present disclosure. FIG. 4 shows the system for adjusting the double-sided LCC compensation network of the wireless charging system according to the present disclosure. The wireless charging system includes a primary-side direct current voltage source, a high-frequency inverter, a primary-side compensation circuit, a primary-side transmitting coil, a secondary-side receiving coil, a secondary-side compensation circuit, a rectifier, a load, and a controller. The system for adjusting the double-sided LCC compensation network includes a first obtaining module 401, a module 402 for determining change rates of a parameter capable of reflecting output performance of the wireless charging system, an adjustable compensation element determining module 403, a real-time coupling coefficient obtaining module 404, a determining module 405, a first adjustment module 406, and a second adjustment module 407.

The first obtaining module 401 is configured to obtain a standard coupling coefficient when the primary-side transmitting coil is aligned with the secondary-side receiving coil, a rated operating frequency, and rated parameter values of compensation elements in the wireless charging system, where the compensation elements include a primary-side compensation inductor, a primary-side series compensation capacitor, a primary-side parallel compensation capacitor, a secondary-side compensation inductor, a secondary-side series compensation capacitor and a secondary-side parallel compensation capacitor.

The module 402 for determining the change rates of the parameter capable of reflecting the output performance of the wireless charging system is configured to determine, based on changes of parameter values of the compensation elements, the change rates of the parameter capable of reflecting the output performance. The parameter capable of reflecting the output performance includes an output power, an output voltage, or a maximum singular value of a transfer function.

The adjustable compensation element determining module 403 is configured to determine an adjustable compensation element based on the change rates of the parameter capable of reflecting the output performance of the wireless charging system, where the adjustable compensation element is a compensation element corresponding to the greatest change rate of the parameter capable of reflecting the output performance of the wireless charging system.

The real-time coupling coefficient obtaining module 404 is configured to obtain a real-time coupling coefficient between the primary-side transmitting coil and the secondary-side receiving coil.

The determining module 405 is configured to determine whether the real-time coupling coefficient is less than a coupling coefficient threshold.

The first adjustment module 406 is configured to adjust an operating frequency of the wireless charging system when the real-time coupling coefficient is not less than the coupling coefficient threshold, where a range of the operating frequency is 81.38 kHz to 90 kHz.

The second adjustment module 407 is configured to adjust both the operating frequency of the wireless charging system and the adjustable compensation element when the real-time coupling coefficient is less than the coupling coefficient threshold.

The real-time coupling coefficient obtaining module 404 includes a first obtaining unit and a real-time coupling coefficient determining unit.

The first obtaining unit is configured to obtain a real-time input voltage of the primary-side direct current voltage source and a real-time current of the secondary-side compensation inductor.

Specifically, the first obtaining unit is configured to obtain the real-time input voltage of the primary-side direct current voltage source and the real-time current of the secondary-side compensation inductor at the rated operating frequency.

The real-time coupling coefficient determining unit is configured to determine the real-time coupling coefficient based on the real-time input voltage and the real-time current.

The second adjustment module 407 includes a unit for determining a standard current value of the secondary-side compensation inductor, a unit for adjusting a parameter value of the adjustable compensation element, a unit for determining a current value of the secondary-side compensation inductor, a first reservation unit, and an adjustment unit.

The unit for determining the standard current value of the secondary-side compensation inductor is configured to determine the standard current value of the secondary-side compensation inductor based on the rated operating frequency.

Specifically, the unit for determining the standard current value of the secondary-side compensation inductor is configured to determine the standard current value of the secondary-side compensation inductor based on the rated operating frequency and the standard coupling coefficient.

The unit for adjusting the parameter value of the adjustable compensation element is configured to adjust the parameter value of the adjustable compensation element when adjusting the operating frequency to be 89 kHz.

The unit for determining the current value of the secondary-side compensation inductor is configured to determine the current value of the secondary-side compensation inductor based on the adjusted parameter value of the adjustable compensation element.

The first reservation unit is configured to reserve the parameter value for the current value of the secondary-side compensation inductor within a specified fluctuation range, that is, the first reservation unit is configured to reserve the adjusted parameter value corresponding to the current value of the secondary-side compensation inductor within the specified fluctuation range, where the specified fluctuation range fluctuates around a standard current by ±10% of the standard current.

The adjustment unit is configured to perform adjustments based on the reserved parameter value.

The second adjustment module includes a second obtaining unit, a unit for determining a current value of an MOSFET at a switching point, and a second reservation unit.

The second obtaining unit is configured to obtain a minimum current value required for releasing all accumulated charges on a parasitic capacitor of the MOSFET within dead time.

The unit for determining the current value of the MOSFET at the switching point is configured to determine the current value of the MOSFET at the switching point with a high-order harmonic wave based on the reserved parameter value.

Specifically, the unit for determining the current value of the MOSFET at the switching point is configured to determine the current value of the MOSFET at the switching point in consideration of the high-order harmonic wave based on the reserved parameter value.

The second reservation unit is configured to reserve again reserved parameter value for the current value of the MOSFET at the switching point which is greater than the minimum current value. That is, the second reservation unit is configured to reserve again the reserved parameter value corresponding to the current value of the MOSFET at the switching point that is greater than the minimum current value.

Various embodiments in this description are described in a progressive manner, and each embodiment focuses on differences from other embodiments, and the same and similar parts among the embodiments may be referred to each other. The system disclosed in the embodiments corresponds to the method disclosed in the embodiments and thus is briefly described, and the relevant parts can refer to the portion of the method.

The principles and implementations of the present disclosure are set forth herein with specific embodiments, and the description of the foregoing embodiments merely intends to help understand the method of the present disclosure and the core ideas thereof. In addition, those of ordinary skill in the art can make various modifications in both the specific implementations and the application scope in accordance with the ideas of the present disclosure. In conclusion, the content of this description shall not be construed as a limitation to the present disclosure.

What is claimed is:

1. A method for adjusting a double sided inductor capacitor capacitor (LCC) compensation network of a wireless charging system, wherein the wireless charging system comprises a primary side direct current voltage source, a high frequency inverter, a primary side compensation circuit, a primary side transmitting coil, a secondary side receiving coil, a secondary side compensation circuit, a rectifier, a load, and a controller, and the method for adjusting the double sided LCC compensation network comprises:

obtaining a standard coupling coefficient when the primary side transmitting coil is aligned with the secondary side receiving coil, a rated operating frequency, and rated parameter values of compensation elements in the wireless charging system, wherein the compensation elements comprise a primary side compensation inductor, a primary side series compensation capacitor, a primary side parallel compensation capacitor, a secondary side compensation inductor, a secondary side series compensation capacitor and a secondary side parallel compensation capacitor;

determining, based on changes in parameter values of the compensation elements, change rates of a parameter capable of reflecting output performance of the wireless charging system, wherein the parameter capable of reflecting the output performance of the wireless charging system comprises an output power, an output voltage, or a maximum singular value of a transfer function;

determining an adjustable compensation element based on the change rates of the parameter capable of reflecting the output performance of the wireless charging system, wherein the adjustable compensation element is a compensation element corresponding to the change rate of the parameter capable of reflecting the output performance of the wireless charging system;

obtaining a real time coupling coefficient between the primary side transmitting coil and the secondary side receiving coil;

determining whether the real time coupling coefficient is less than a coupling coefficient threshold; and adjusting an operating frequency of the wireless charging system when the real time coupling coefficient is not less than the coupling coefficient threshold, wherein a range of the operating frequency is 81.38 kHz to 90 kHz; or adjusting both an operating frequency of the wireless charging system and the adjustable compensation element when the real time coupling coefficient is less than the coupling coefficient threshold.

2. The method for adjusting the double sided LCC compensation network of the wireless charging system according to claim 1, wherein the obtaining the real time coupling coefficient between the primary side transmitting coil and the secondary side receiving coil comprises:
    obtaining a real time input voltage of the primary side direct current voltage source and a real time current of the secondary side compensation inductor; and
    determining the real time coupling coefficient based on the real time input voltage and the real time current.

3. The method for adjusting the double sided LCC compensation network of the wireless charging system according to claim 1, wherein the adjusting both the operating frequency of the wireless charging system and the adjustable compensation element when the real time coupling coefficient is less than the coupling coefficient threshold comprises: determining a standard current value of the secondary side compensation inductor based on the rated operating frequency;
    adjusting a parameter value of the adjustable compensation element when adjusting the operating frequency to be 89 kHz;
    determining a current value of the secondary side compensation inductor based on the adjusted parameter value of the adjustable compensation element;
    reserving the parameter value for the current value of the secondary side compensation inductor within a specified fluctuation range, wherein the specified fluctuation range fluctuates around a standard current by "10% of the standard current; and
    performing adjustments based on the reserved parameter value.

4. The method for adjusting the double sided LCC compensation network of the wireless charging system according to claim 3, wherein after the reserving the parameter value for the current value of the secondary side compensation inductor within the specified fluctuation range, the method further comprises:
    obtaining a minimum current value required for releasing all accumulated charges on a parasitic capacitor of a metal oxide semiconductor field effect transistor (MOSFET) within dead time;
    determining a current value of the MOSFET at a switching point with a high order harmonic wave based on the reserved parameter value; and
    reserving again a reserved parameter value for the current value of the MOSFET at the switching point which is greater than the minimum current value.

5. A system for adjusting a double sided inductor-capacitor-capacitor (LCC) compensation network of a wireless charging system, the system comprising:
    wherein the wireless charging system comprises a primary-side direct current voltage source, a high-frequency inverter, a primary-side compensation circuit, a primary-side transmitting coil, a secondary-side receiving coil, a secondary-side compensation circuit, a rectifier, a load, and a controller, and the system for adjusting the double-sided LCC compensation network comprises:
    a first obtaining module, configured to obtain a standard coupling coefficient when the primary-side transmitting coil is aligned with the secondary-side receiving coil, a rated operating frequency, and rated parameter values of compensation elements in the wireless charging system, wherein the compensation elements comprise a primary-side compensation inductor, a primary-side series compensation capacitor, a primary-side parallel compensation capacitor, a secondary-side compensation inductor, a secondary-side series compensation capacitor and a secondary-side parallel compensation capacitor;
    a module for determining change rates of a parameter capable of reflecting output performance of the wireless charging system, configured to determine, based on changes in parameter values of the compensation elements, the change rates of the parameter capable of reflecting the output performance of the wireless charging system, wherein the parameter capable of reflecting the output performance of the wireless charging system comprises the output power, the output voltage, or the maximum singular value of a transfer function;
    an adjustable compensation element determining module, configured to determine an adjustable compensation element based on the change rates of the parameter capable of reflecting the output performance of the wireless charging system, wherein the adjustable compensation element is a compensation element corresponding to the largest change rate of the parameter capable of reflecting the output performance of the wireless charging system; a real-time coupling coefficient obtaining module, configured to obtain a real-time coupling coefficient between the primary-side transmitting coil and the secondary-side receiving coil;
    a determining module, configured to determine whether the real-time coupling coefficient is less than a coupling coefficient threshold;
    a first adjustment module, configured to adjust an operating frequency of the wireless charging system when the real-time coupling coefficient is not less than the coupling coefficient threshold, wherein a range of the operating frequency is 81.38 kHz to 90 kHz; and
    a second adjustment module, configured to adjust both the operating frequency of the wireless charging system and the adjustable compensation element when the real-time coupling coefficient is less than the coupling coefficient threshold.

6. The system for adjusting the double sided LCC compensation network of the wireless charging system according to claim 5, wherein the real time coupling coefficient obtaining module comprises:

a first obtaining unit, configured to obtain a real time input voltage of the primary side direct current voltage source and a real time current of the secondary side compensation inductor; and a real time coupling coefficient determining unit, configured to determine the real time coupling coefficient based on the real time input voltage and the real time current.

7. The system for adjusting the double sided LCC compensation network of the wireless charging system according to claim 5, wherein the second adjustment module comprises:

a unit for determining a standard current value of the secondary side compensation inductor, configured to determine the standard current value of the secondary side compensation inductor based on the rated operating frequency;

a unit for adjusting a parameter value of the adjustable compensation element, configured to adjust the parameter value of the adjustable compensation element when adjusting the operating frequency to be 89 kHz;

a unit for determining a current value of the secondary side compensation inductor, configured to determine the current value of the secondary side compensation inductor based on the adjusted parameter value of the adjustable compensation element;

a first reservation unit, configured to reserve the parameter value for the current value of the secondary side compensation inductor within a specified fluctuation range, wherein the specified fluctuation range fluctuates around a standard current by "10% of the standard current; and an adjustment unit, configured to perform adjustments based on the reserved parameter value.

8. The system for adjusting the double sided LCC compensation network of the wireless charging system according to claim 7, wherein the second adjustment module comprises:

a second obtaining unit, configured to obtain a minimum current value required for releasing all accumulated charges on a parasitic capacitor of an MOSFET within dead time;

a unit for determining a current value of the MOSFET at a switching point, configured to determine the current value of the MOSFET at the switching point with a high order harmonic wave based on the reserved parameter value; and a second reservation unit, configured to reserve again a reserved parameter value for the current value of the MOSFET at the switching point which is greater than the minimum current value.

\* \* \* \* \*